Sept. 8, 1953 S. D. STOOKEY 2,651,145
PHOTOSENSITIVELY OPACIFIABLE GLASS
Filed July 7, 1950
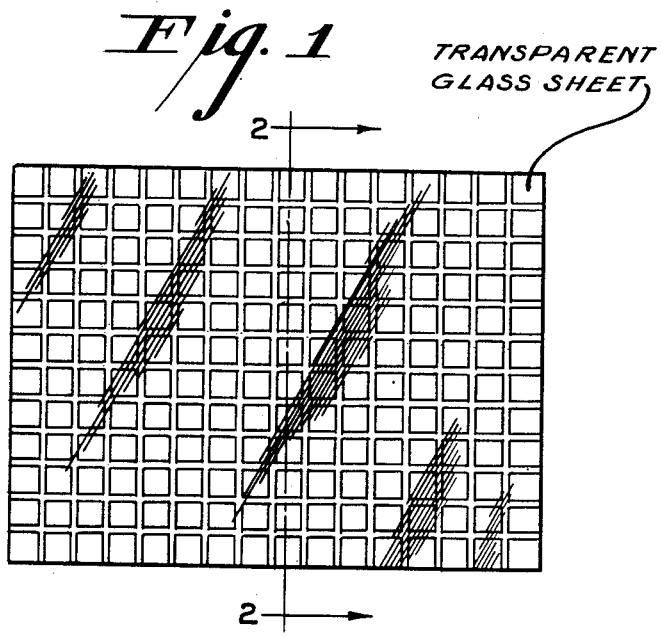
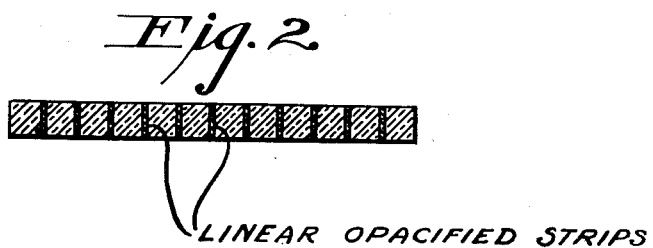
INVENTOR.
STANLEY DONALD STOOKEY
BY
ATTORNEY.

Patented Sept. 8, 1953

2,651,145

UNITED STATES PATENT OFFICE 2,651,145

PHOTOSENSITIVELY OPACIFIABLE GLASS

Stanley Donald Stookey, Corning, N. Y., assignor to Corning Glass Works, Corning, N. Y., a corporation of New York Application July 7, 1950, Serial No. 172,596

39 Claims. (Cl. 49—88)

This invention relates to photosensitively opacifiable glasses or glasses which are capable of being thermally opacified following only exposure to short-wave radiations.

Photosensitive glasses of this type, containing gold as the primary photosensitizing agent, are described in my pending application Serial No. 69,769, filed January 7, 1949, now Patent No. 2,515,943 issued July 8, 1950. For successful development, such gold-containing glasses must be held for extended periods of time at temperatures close to their softening points. Because of their resulting tendency to soften, these glasses have not been entirely satisfactory for the production of all types of ware, however, and close temperature control must be employed to prevent undue deformation of such ware as can be readily made. (As used herein, the "softening point" of a glass is that defined in an article entitled "A method for measuring the softening temperature of glass," by J. T. Littleton, Jour. Amer. Ceram. Soc. 10, 259 (1927).)

I have now discovered photosensitively opacifiable glass compositions which avoid these difficulties. These glasses employ silver as the primary photosensitizing agent and are particularly advantageous in that they can be satisfactorily developed in considerably shorter times and/or at considerably lower temperatures, whereby softening and resultant deformation of ware can be avoided. Moreover, the present glasses possess a greater degree of photosensitivity.

The glasses according to the present invention comprise essentially, on the oxide basis, 55% to 75% $SiO_2$, the indicated proportion of at least one alkali metal oxide selected from the group consisting of up to 2% $Li_2O$, 5% to 18% $Na_2O$, and up to 13% $K_2O$, the selected alkali metal oxide including $Na_2O$, the total alkali metal oxide content being 12% to 18%, 2% to 12% $Al_2O_3$, 0.0001% to 0.3% of silver computed as AgCl, 0.005% to 0.05% $CeO_2$, 1.8% to 3.0% of analytically determined fluorine, and the indicated proportion of a halogen selected from the group consisting of 0.01% to 0.2% of analytically determined chlorine, 0.02% to 0.4% of analytically determined bromine, and 0.03% to 0.6% of analytically determined iodine. These essential constituents must amount to at least 85% of the total composition.

The base glass, exclusive of photosensitizing and opacifying agents, comprises silica, at least one alkali metal oxide as indicated, and alumina in the amounts specified. The use of these ingredients in proportions outside the indicated ranges results in an unsatisfactory product. For example, an excess of $SiO_2$ or a deficiency of alkali metal oxide produces a glass which is difficult to melt and which tends to spontaneously opacify during working. On the other hand, an excess of alkali metal oxide or too little $SiO_2$ objectionably decreases the chemical stability of the glass. At least 2% $Al_2O_3$ is necessary to prevent spontaneous opacification but more than 12% objectionably hardens the glass.

Preferably, the alkali metal oxide comprises $Na_2O$ alone. $Li_2O$ and/or $K_2O$ can be employed in combination with $Na_2O$ in the indicated proportions, however. More than the indicated maximum proportion of $Li_2O$ tends to objectionably soften the glass and to result in devitrification, while larger amounts of $K_2O$ cause the glass to become too hard and tend to bring about spontaneous opacification.

Small amounts of $B_2O_3$ may advantageously be employed to facilitate melting and working of the glass. However, amounts greater than 5% tend to weaken the photosensitivity of the glass and to cause it to be excessively soft.

The oxides of the divalent metals Be, Mg, Ca, Zn, Sr, Cd, and Ba may also be included within the limits specified below in order to generally improve the chemical durability of the present glasses. Because of their tendency to induce spontaneous opacification, however, BeO, MgO, and CaO should not be present in amounts exceeding 3% either individually or collectively; ZnO, SrO, and BaO in amounts up to 12%, and CdO in amounts up to 5%. Of these divalent oxides, ZnO has been found the most desirable. Regardless of which divalent oxides are employed, however, the total content thereof should not be greater than 12%.

It is essential that the presence of materials which strongly absorb ultraviolet radiations be avoided. Such absorptive constituents include most glass colorants, particularly selenium or its compounds and oxides of iron, copper, uranium, and vanadium, as well as the non-coloring oxides of arsenic, thallium and lead.

The silver may be introduced into the batch as any salt or compound thereof. Preferably, a water solution of silver nitrate is employed. The minimum amount of silver effective to produce a noticeable degree of photosensitivity is 0.0001% computed as AgCl. The opacified image is generally white when the silver content is less than about 0.002%. As the proportion of silver is increased, however, a yellowish tint tends to be imparted to the opaque image, particularly with long or intense irradiation. With a silver content in excess of about 0.05%, the image is almost invariably colored. More than 0.3% of silver tends to spontaneously color the glass throughout during melting or reheating.

The presence of $CeO_2$ is necessary in order to promote and enhance the photosensitivity of the silver. Less than 0.005% $CeO_2$ is relatively ineffective, while more than about 0.05% causes sufficient absorption of ultraviolet radiations to effectively destroy the photosensitivity of the glass. As a source of $CeO_2$, a material known as "cerium hydrate," having a cerium content equivalent to about 75% $CeO_2$, has been found satisfactory although other salts and compounds of cerium may be used.

The amount of fluorine incorporated into the glass must be insufficient to cause opacification upon reheating. The fluorine may be introduced into the batch as any of its common compounds, such as sodium- or potassium-silicofluoride, cryolite, or alkali metal fluoride. It is impossible, however, to state a definite amount of fluorine which, when introduced into the batches for the present glasses, will produce the desired result under all conditions, because a considerable amount is unavoidably lost by volatilization in the melting of the batch, depending upon the time and temperature of melting and the type of melting container, that is, whether open or closed. I have nevertheless determined that the amount of fluorine remaining in the final glass, that is, analytically determined fluorine, must be not less than about 1.8% or greater than about 3.0% to produce the present result, regardless of the quantity of fluorine added to the batch. Less than about 1.8% fluorine results in little or no opacification, while more than about 3.0% fluorine results in spontaneous opacification.

In what form the fluorine exists in the unopacified glass is not definitely known, but it is believed that at least some of it is in the form of alkali metal fluoride dissolved in the glass. In any event, it has been determined that the opacifying crystallites in the exposed and developed glass contain fluorine and are composed largely, if not entirely, of alkali metal fluoride, in particular sodium fluoride.

The presence of chlorine, bromine, or iodine in the amounts indicated is necessary to activate the silver and make it effectively photosensitive. Like fluorine, these other halogens tend to volatilize during melting; but I have found that the analytically determined amount remaining in the glass must not be less than 0.01% chlorine, 0.02% bromine or 0.03% iodine and not more than 0.2% chlorine, 0.4% bromine or 0.6% iodine. Smaller amounts than those indicated are ineffective to activate the silver, whereas larger amounts tend to cause spontaneous opacification. These three halogens may be used collectively, if desired. When so employed, however, their total content, computed on a mole equivalent basis, must be within the limitations set forth above for any one taken individually.

The presence of up to 0.2% of antimony oxide computed as $Sb_2O_3$ or up to 0.1% $SnO_2$ is advantageous for increasing the photosensitivity of the glass. Greater amounts of either oxide tend to cause overall coloration of the glass when melted, thus destroying the photosensitivity. $Sb_2O_3$ also exerts a desirable fining action during melting of the glass, and its presence is generally preferred to that of $SnO_2$.

The following batches are illustrative of glass compositions falling within the scope of my invention (weight in pounds except the gold solution, which is expressed in cc.):

| | 1 | 2 | 3 | 4 | 5 | 6 | 7 | 8 | 9 | 10 | 11 | 12 | 13 |
|---|---|---|---|---|---|---|---|---|---|---|---|---|---|
| Sand | 267 | 348 | 350 | 348 | 348 | 364 | 350 | 336 | 336 | 364 | 353 | 267 | 350 |
| $Na_2CO_3$ | 99 | 130 | 133 | 122 | 130 | 138 | 133 | 116 | 56 | 136 | 138 | 99 | 125 |
| $NaNO_3$ | | | | 14 | | | | | | | | | 14 |
| $K_2CO_3$ | | | | | | | | | 62 | | | | |
| $Al(OH)_3$ | 60 | 52 | 52 | 52 | 52 | 82 | 52 | 38 | 38 | 82 | 49 | 60 | 52 |
| Borax (anhydrous) | 3.3 | | | | | 4 | | | | | 4.2 | | |
| $CaCO_3$ | | | | | 13 | | | | | | 9 | | |
| ZnO | | 25 | 25 | 25 | 18 | | 25 | | | | 7.5 | | 25 |
| $BaCO_3$ | | | | | | | | 64 | 64 | | 16 | | |
| $AgNO_3$ | 0.0078 | 0.01 | 0.01 | 0.02 | 0.02 | 0.01 | 0.001 | 0.01 | 0.01 | 0.02 | 0.03 | 0.01 | |
| AgCl | | | | | | | | | | | | | 1 |
| Cerium Hydrate (75% $CeO_2$) | 0.05 | 0.125 | 0.1 | 0.125 | 0.125 | 0.1 | 0.1 | 0.1 | 0.1 | 0.15 | 0.1 | 0.05 | 0.1 |
| $Sb_2O_3$ | 0.36 | 0.5 | | 0.5 | 0.5 | 0.5 | 0.3 | 0.5 | 0.5 | 0.5 | 0.5 | | 0.3 |
| $SnO_2$ | | | 0.3 | | | | | | | | | | |
| 25% Gold Soln cc | | | | 36 | | | | | | | | | |
| $Na_2SiF_6$ | 19 | 25 | 19.5 | 25 | 25 | 22 | 19 | 22 | 18 | 18 | 22 | 19 | 19 |
| $NH_4Cl$ | | | | | | | | | | 4 | | | |
| NaCl | | | | | 1 | | | | | | | | |
| NaBr | 1.3 | 1.75 | 1.75 | 1.75 | | | 1.75 | | 1.75 | | 1.75 | 1.3 | 1.75 |
| KBr | | | | | | | | 1.75 | | | | | |
| NaI | | | | | 2 | | | | | | | | |
| Corn Starch | | 0.4 | 0.4 | | 0.4 | | 0.3 | | | | | | |

The silver nitrate is incorporated in the above batches as a dilute aqueous solution. The gold solution is prepared by dissolving metallic gold in aqua regia in the proportions of 25 grams of gold per 100 cc. of solution.

As is well known, the exact compositions of halogen-containing glasses cannot be calculated with accuracy from their batches. In the first place, as pointed out above, considerable halogen in variable amounts is lost during melting and the exact halogen content of the final glass can be determined only by analysis. Moreover, the halogens are anions, but with which cation or cations they are combined is not definitely known. The calculated final content of the halogens computed as F, Cl, Br, or I respectively is therefore independent of the base composition, which is always computed on the oxide basis.

For practical purposes, however, the calculated percentages of the oxides and the calculated percentages of the halogens are generally computed together to a total of 100%, although this results in a slight error in the expressed amounts of the various constituents as compared to their analytical amounts. The calculated compositions of such glasses are therefore approximate.

The calculated composition of the glass obtained by melting batch 1, for example, is 69.4% $SiO_2$, 16.7% $Na_2O$, 10.1% $Al_2O_3$, 0.6% $B_2O_3$, 0.0017% of silver computed as AgCl, 0.01% $CeO_2$, 0.09% $Sb_2O_3$, 2.9% F, and 0.25% Br. By comparison a glass produced by actually melting this batch in a large commercial melting unit at a top temperature of approximately 1400° C. contained by analysis 2.6% fluorine and 0.2% bromine. The composition of this glass as recalculated is then 69.6% $SiO_2$, 16.8% $Na_2O$, 10.1% $Al_2O_3$, 0.6% $B_2O_3$, 0.0017% of silver computed as AgCl, 0.01% $CeO_2$, 0.09% $Sb_2O_3$, 2.6% F, and 0.2% Br.

The glass produced by melting batch 1 possesses physical properties particularly desirable for melting and forming purposes and comprises a preferred embodiment of my invention. Due to the presence of ZnO, the glass melted from batch 2 possesses good chemical durability and represents another preferred embodiment. The composition of this latter glass, computed and recalculated in the manner described above, is 69.1% $SiO_2$, 16.5% $Na_2O$, 6.6% $Al_2O_3$, 4.8% ZnO, 0.002% of silver computed as AgCl, 0.02% $CeO_2$, 0.1% $Sb_2O_3$, 2.6% F and 0.2% Br.

It will be noted that all of the batches contain a mild reducing agent, the presence of which during melting is essential. When either a bromide or an iodide, such as NaBr or NaI, is used to furnish the halogen (other than fluorine), such compound itself functions as the reducing agent. If a chloride such as NaCl is used to furnish such halogen, then, except in the case of $NH_4Cl$, another material such as corn starch, as in batch 5, must be added.

In any event, the addition to the batch of a minor amount of a reducing agent other than a halide as indicated, preferably of an organic type such as starch, sugar, or urea, serves to increase the photographic speed of the glass by as much as five times. In general, corn starch in an amount up to about 0.2% on the basis of the glass or another reducing agent in an amount to provide the equivalent reducing power or effect is sufficient for the purpose. Larger amounts tend to render the glass spontaneously opacifiable upon thermal treatment.

An oxidizing agent such as sodium nitrate is desirably employed with the larger proportions of silver, generally above about 0.05%, to insure that the silver dissolves in the glass. If the glass is also to contain gold as in batch 4, the use of an oxidizing agent is necessary.

The present glasses are clear and transparent when melted, worked, and cooled, and will so remain when merely reheated. Exposure to short-wave radiations, preferably those between 3000 and 3500 Angstroms, produces an invisible, latent image therein. This latent image, present only in the exposed portions of the glass, is converted to a visible, opaque image by subsequent heating. If a photographic negative or stencil is interposed between the glass and the source of radiation, only selected areas of the glass will be exposed, and the image formed will be a reproduction of the negative or stencil. The exposure time may vary from about ten seconds to an hour or longer, depending on the particular glass composition, the image characteristics desired, and the intensity and type of radiation employed. With a 60-ampere carbon arc at a distance of one foot, an average exposure can be accomplished in about thirty seconds. Generally speaking, exposure times of over about 5 to 10 minutes are unnecessary.

The latent image produced in the glass during exposure is converted to a visible opaque image by a two-stage development. The initial step involves heating the exposed glass for a time and at a temperature varying from about one minute at 50° C. above the softening point of the glass to about one hour at about 150° C. below the softening point. Temperatures lower than 150° C. below the softening point are ineffective, and temperatures higher than 50° C. above the softening point are both impractical and detrimental to the image. Preferably, unless a shaping operation is to be carried out simultaneously, the temperature should be about 50 to 100° C. below the softening point to accomplish this initial development within a reasonable time and to avoid possible deformation of the article or sticking of the article to its support. Too rapid heating of the glass above 500° C. tends to destroy the latent image before it can be developed and should be avoided.

This initial heat treatment does not cause any opacification but is nevertheless essential for the ultimate development of the latent image. If, however, the silver content is above about 0.002% as indicated above, the latent image may, as the result of such heating, develop into a real image which tends towards a yellowish tint but is otherwise transparent. It is believed that during such heat treatment submicroscopic nuclei of colloidal silver are formed in the irradiated portions of the glass and that, if the silver content is above about 0.002%, the silver nuclei will be of a size and number sufficient to tend to cause a yellowish coloration of the glass.

Following such preliminary heat treatment the glass is cooled to a temperature below about 500° C. During this step, also, no further visible change in the glass occurs. It is believed that submicroscopic nuclei of the opacifying agent or agents, that is, alkali metal fluorides, are formed on the silver nuclei as a result of this cooling, and that the formation of such invisible fluoride nuclei is entirely dependent upon the presence of the silver nuclei without which opacification of the latent image could not be initiated. While the glasses must be cooled to below this temperature to accomplish the subsequent opacification, how much below seems to be immaterial and they may be cooled to room temperature if desired.

Having been so cooled, the glass is again heated at a temperature and for a time sufficient to cause the fluoride nuclei to grow and form opacifying crystallites. For this purpose the temperature should be not lower than about 100° C. below the softening point. The reheating time depends on the density desired in the final image and on the temperature, greater densities requiring correspondingly longer times and higher temperatures shorter times. For average image development, a period of 3 to 15 minutes is usually adequate. The finished glass is thereafter cooled to room temperature.

It is only during this second heating that the final opacified image is developed and then only in the irradiated portions of the glass. Such image will appear white or uncolored unless the preliminary heating has caused development of a yellowish tint as described above. The opacity will be more or less dense according to the nature of the exposure and the initial heat treatment, which determine the number of nuclei formed, and also the final heat treatment, which determines the size to which the opacifying crystallites grow.

With some glasses containing fluorine in the upper half or so of the indicated range, it may be found that the initial heat treatment and intermediate cooling may be omitted and that the desired opaque image can be obtained with a single heat treatment. In general, however, it will be found that the described two-step heat treatment is necessary.

Various effects can be achieved with the present glasses. For example, different shades or hues can be produced in the same article by exposing different areas to different intensities of irradiation or for different times. Again, the temperature employed in either heating step or the duration thereof has an effect on the shade and/or hue produced. The use of progressively slighter exposures together with progressively longer or higher-temperature heating in the first heating step, while keeping the temperature below 550° C. in the final heating step, results in the production of yellow, brown, orange, rose, purple, blue, and green hues in this order.

A further variation is obtained by the inclusion of $Sb_2O_3$ and $SnO_2$, which together impart a grayish or a pinkish tint to the opal image depending on the proportions in which they are used. The total of $Sb_2O_3$ and $SnO_2$ combined should not exceed 0.2%, and the maximum amount of $SnO_2$ should not exceed 0.1%. A pinkish coloration can also be produced by the inclusion of up to 0.01% of gold computed as Au. A colored background can be provided by including a suitable coloring material such as cobalt oxide or manganese oxide in the glass.

Further exposure of irradiated areas between the two heat-treating steps surprisingly effects a reversal of the opal development, that is, the re-exposed areas remain clear and transparent following the second heat treatment. For example, an overall initial exposure of an article followed by heating and subsequent re-exposure of a portion thereof thus produces a transparent image against an opaque background.

Surface opacity can be produced by special treatment in glasses of the present type melted from batches containing no silver. By applying to the surface of such a glass a finely divided material containing silver or a compound of silver and heating the glass and the material while in contact in accordance with conventional silver-staining procedure, an exchange of silver for alkali metal in the glass is effected. The surface of such a silver-stained glass, when subsequently held at a temperature above about 550° C. for about 15 minutes or longer and then cooled below about 500° C., becomes opacified upon reheating to a temperature not lower than about 100° C. below the softening point of the glass. Alternatively, the glass and the silver-staining material can be heated to a temperature above about 550° C. for at least 15 minutes, and the silver-stained glass then cooled and reheated as indicated. No exposure to short-wave radiations is necessary to produce such opacity. Reversal of this opal formation can be effected by exposure of the stained area in the usual manner prior to the final heat treatment. Such method of producing surface opacity in glass is claimed in my pending application S. N. 288,313, filed May 16, 1952, which is a division of this application.

The inclusion of corn starch in the batch in amounts greater than that permissible for normal development procedures but not over about 0.6% on the basis of the glass, or of another reducing agent in an amount to provide the equivalent reducing power, produces a surprising effect in that the tendency to spontaneous opacification upon heating is thereby reversed by exposure of the glass to short-wave radiations prior to such heat treatment. Exposure of such a glass in selected areas followed by heating then renders the glass opaque in unexposed areas, but clear and transparent in exposed areas. The thermal conditions for opal development in these glasses are identical with those of the final heat treatment of the developing process described above.

The glasses of this invention and articles made therefrom containing opacified images are useful and desirable for many purposes, both ornamental and utilitarian. Of particular use and desirability are glass sheets in which the image consists of a series of narrow, opacified, linear strips or portions extending through the sheet from one face to the other at any suitable angle to the plane thereof, as shown, only by way of example, in the accompanying drawing, in which:

Fig. 1 is a plan view of a transparent glass sheet having linear opacified strips in accordance with my invention, the thickness of the sheet and the opacified portions being exaggerated for convenience, and Fig. 2 is a sectional view on line 2—2 of Fig. 1. The spaces between the opacified strips are clear and transparent, and are of such width as to render the opacified strips effective as louvers whereby light can be transmitted in a direction perpendicular to the face of the sheet, but is partially or completely intercepted in a direction at an angle to the face of the sheet and to the strips.

The present glasses are also extremely useful in producing such completely opalized articles as tableware or incandescent lamp bulbs. Because of the variety of effects obtainable with the present glasses, simultaneous production of all-transparent, all-opal and partially opalized ware from a single glass melt is possible.

When the present glasses are to be used in the manufacture of tempered opalware the article can be inspected, prior to opacification and tempering, for stones and other imperfections which would normally cause breakage. A partially opacified article may also be tempered without setting up undue strains between the opacified and transparent portions thereof. Thus for the first time a tempered article having both transparent and opaque areas can be produced. As is well known, prior articles partially opacified by gradient heating become completely opacified when heated for tempering.

Photosensitive glasses containing from 0.05% to 0.3% of silver computed as AgCl are described and claimed in pending application Serial No. 513,441, filed December 8, 1943, by William H. Armistead, now Patent 2,515,936, issued July 18, 1950. Such glasses, when exposed and subsequently heated, develops a transparent yellow coloration in the exposed portions, while the unexposed portions remain clear and colorless.

In my pending application Serial No. 513,445, also filed December 8, 1943, now Patent 2,515,939, issued July 18, 1950, I have disclosed and claimed photosensitive glasses similar to those of Armistead but additionally containing sufficient fluorine to render them thermally opacifiable.

My pending application Serial No. 695,801, filed September 9, 1946, now Patent 2,515,940, issued July 18, 1950, describes and claims photosensitively opacifiable glasses containing 0.025% to 0.3% of silver computed as AgCl and 10% to 25% $Li_2O$, the amount of $Li_2O$ being sufficient to form lithium disilicate crystallites upon exposure and subsequent heating.

In my pending application Serial No. 1,492, filed January 9, 1948, now Patent 2,515,275, issued July 18, 1950, there are described and claimed photosensitive glasses similar to those of Armistead but containing up to 0.1% $Sb_2O_3$. Such glasses may also contain sufficient fluorine to be thermally opacifiable.

I claim:

1. A clear, transparent photosensitive glass comprising essentially 55% to 75% $SiO_2$, the indicated proportion of at least one alkali metal oxide selected from the group consisting of up to 2% $Li_2O$, 5% to 18% $Na_2O$, and up to 13% $K_2O$, the selected alkali metal oxide including $Na_2O$, the total alkali metal oxide content being 12% to 18%, 2% to 12% $Al_2O_3$, 0.0001% to 0.3% of silver computed as AgCl, 0.005% to 0.5% $CeO_2$, 1.8% to 3.0% of analytically determined fluorine, and the indicated proportion of a halogen selected from the group consisting of 0.01% to 0.2% of analytically determined chlorine, 0.02 to 0.4% of analytically determined bromine, and 0.03% to 0.6% of analytically determined iodine, the essential constituents totaling at least 85%, said glass being thermally opacifiable only in such areas as have been previously exposed to short-wave radiations.

2. The photosensitive glass as claimed in claim 1, which includes up to 0.2% antimony oxide computed as $Sb_2O_3$.

3. A clear, transparent photosensitive glass comprising essentially 55% to 75% $SiO_2$, 12% to 18% $Na_2O$, 2% to 12% $Al_2O_3$, 0.0001% to 0.3% of silver computed as AgCl, 0.005% to 0.05% $CeO_2$, 1.8% to 3.0% of analytically determined fluorine, and the indicated proportion of a halogen selected from the group consisting of 0.01% to 0.2% of analytically determined chlorine, 0.02% to 0.4% of analytically determined bromine, and 0.03% to 0.6% of analytically determined iodine, the essential constituents totaling at least 85%, said glass being thermally opacifiable only in such areas as have been previously exposed to short-wave radiations.

4. A clear, transparent photosensitive glass comprising essentially 55% to 75% $SiO_2$, 12% to 18% $Na_2O$, 2% to 12% $Al_2O_3$, 0.0001% to 0.3% of silver computed as AgCl, 0.005% to 0.05% $CeO_2$, 1.8% to 3.0% of analytically determined fluorine, and 0.01% to 0.2% of analytically determined chlorine, the essential constituents totaling at least 85%, said glass being thermally opacifiable only in such areas as have been previously exposed to short-wave radiations.

5. A clear, transparent photosensitive glass comprising essentially 55% to 75% $SiO_2$, 12% to 18% $Na_2O$, 2% to 12% $Al_2O_3$, 0.0001% to 0.3% of silver computed as AgCl, 0.005% to 0.05% $CeO_2$, 1.8% to 3.0% of analytically determined fluorine, and 0.02% to 0.4% of analytically determined bromine, the essential constituents totaling at least 85%, said glass being thermally opacifiable only in such areas as have been previously exposed to short-wave radiations.

6. A clear, transparent photosensitive glass comprising essentially 55% to 75% $SiO_2$, 12% to 18% $Na_2O$, 2% to 12% $Al_2O_3$, 0.0001% to 0.3% of silver computed as AgCl, 0.005% to 0.05% $CeO_2$, 1.8% to 3.0% of analytically determined fluorine, and 0.03% to 0.6% of analytically determined iodine, the essential constituents totaling at least 85%, said glass being thermally opacifiable only in such areas as have been previously exposed to short-wave radiations.

7. The photosensitive glass as claimed in claim 1, which includes up to 5% $B_2O_3$.

8. The photosensitive glass as claimed in claim 7, which includes up to 0.2% antimony oxide computed as $Sb_2O_3$.

9. The photosensitive glass as claimed in claim 1, which includes the indicated proportion of at least one divalent metal oxide selected from the group consisting of up to 3% BeO, up to 3% MgO, up to 3% CaO, up to 3% of a mixture of a plurality of such three oxides, up to 12% ZnO, up to 12% SrO, up to 5% CdO, and up to 12% BaO, the total divalent metal oxide content being not over 12%.

10. The photosensitive glass as claimed in claim 9, which includes up to 0.2% antimony oxide computed as $Sb_2O_3$.

11. The photosensitive glass as claimed in claim 1, which includes up to 5% $B_2O_3$ and up to 12% ZnO.

12. A photosensitive glass as claimed in claim 1, which includes up to 0.1% $SnO_2$.

13. The photosensitive glass as claimed in claim 1, which includes up to 0.2% $Sb_2O_3$ and $SnO_2$ combined, the content of $SnO_2$ being not over 0.1%.

14. The photosensitive glass as claimed in claim 1, which includes up to 0.01% of gold computed as Au.

15. A clear, transparent photosensitive glass which consists approximately of 69.6% $SiO_2$, 16.8% $Na_2O$, 10.1% $Al_2O_3$, 0.6% $B_2O_3$, 0.0017% of silver computed as AgCl, 0.01% $CeO_2$, 0.09% $Sb_2O_3$, 2.6% of analytically determined fluorine and 0.2% of analytically determined bromine, said glass being thermally opacifiable only in such areas as have been previously exposed to short-wave radiations.

16. A clear, transparent photosensitive glass which consists approximately of 69.1% $SiO_2$, 16.5% $Na_2O$, 6.6% $Al_2O_3$, 4.8% ZnO, 0.002% of silver computed as AgCl, 0.02% $CeO_2$, 0.1% $Sb_2O_3$, 2.6% of analytically determined fluorine and 0.2% of analytically determined bromine, said glass being thermally opacifiable only in such areas as have been previously exposed to short-wave radiations.

17. An article comprising a glass body composed throughout of a transparent photosensitive glass comprising essentially 55% to 75% $SiO_2$, the indicated proportion of at least one alkali metal oxide selected from the group consisting of up to 2% $Li_2O$, 5% to 18% $Na_2O$, and up to 13% $K_2O$, the selected alkali metal oxide including $Na_2O$, the total alkali metal oxide content being 12% to 18%, 2% to 12% $Al_2O_3$, 0.0001% to 0.3% of silver computed as AgCl, 0.005% to 0.05% $CeO_2$, 1.8% to 3.0% of analytically determined fluorine, and the indicated proportion of a halogen selected from the group consisting of 0.01% to 0.2% of analytically determined chlorine, 0.02% to 0.4% of analytically determined bromine and 0.03% to 0.6% of analytically determined iodine, the essential constituents totaling at least 85%, said glass body containing within its mass a latent image capable of being developed, by uniform heating of the entire glass body, into a visible, opaque image.

18. An article comprising a glass body composed throughout of a photosensitive glass comprising essentially 55% to 75% $SiO_2$, the indicated proportion of at least one alkali metal oxide selected from the group consisting of up to 2% $Li_2O$, 5% to 18% Na₂O, and up to 13% K₂O, the selected alkali metal oxide including Na₂O, the total alkali metal oxide content being 12% to 18%, 2% to 12% Al₂O₃, 0.0001% to 0.3% of silver computed as AgCl, 0.005% to 0.05% CeO₂, 1.8% to 3.0% of analytically determined fluorine, and the indicated proportion of a halogen selected from the group consisting of 0.01% to 0.2% of analytically determined chlorine, 0.02% to 0.4% of analytically determined bromine, and 0.03% to 0.6% of analytically determined iodine, the essential constituents totaling at least 85%, at least a portion of the glass body containing light-diffusing, fluorine-containing crystallites rendering the same opaque.

19. An article comprising a glass body composed throughout of a photosensitive glass comprising essentially 55% to 75% SiO₂, 12% to 18% Na₂O, 2% to 12% Al₂O₃, 0.0001% to 0.3% of silver computed as AgCl, 0.005% to 0.05% CeO₂, 1.8% to 3.0% of analytically determined fluorine, and the indicated proportion of a halogen selected from the group consisting of 0.01% to 0.2% of analytically determined chlorine, 0.02% to 0.4% of analytically determined bromine, and 0.03% to 0.6% of analytically determined iodine, the essential constituents totaling at least 85%, at least a portion of the glass body containing light-diffusing, fluorine-containing crystallites rendering the same opaque.

20. The article as claimed in claim 18, in which the glass includes up to 0.2% antimony oxide computed as Sb₂O₃.

21. The article as claimed in claim 18, in which the glass includes up to 5% B₂O₃.

22. The article as claimed in claim 21, in which the glass includes up to 0.2% antimony oxide computed as Sb₂O₃.

23. The article as claimed in claim 18, in which the glass includes the indicated proportion of at least one divalent metal oxide selected from the group consisting of up to 3% BeO, up to 3% MgO, up to 3% CaO, up to 3% of a mixture of a plurality of such three oxides, up to 12% ZnO, up to 12% SrO, up to 5% CdO, and up to 12% BaO, the total divalent metal oxide content being not over 12%.

24. The article as claimed in claim 23, in which the glass includes up to 0.2% antimony oxide computed as Sb₂O₃.

25. The article as claimed in claim 18, in which the glass includes up to 5% B₂O₃ and up to 12% ZnO.

26. The article as claimed in claim 18, in which the glass includes up to 0.1% SnO₂.

27. The article as claimed in claim 18, in which the glass includes up to 0.2% Sb₂O₃ and SnO₂ combined, the content of SnO₂ being not over 0.1%.

28. The article as claimed in claim 18, in which the glass includes up to 0.01% of gold computed as Au.

29. An article according to claim 18, in which the opaque portion of the glass body forms a predetermined design or image and the remainder is transparent.

30. An article according to claim 18, characterized in that the glass body is tempered.

31. An article according to claim 18, in the form of a glass sheet, selected linear portions of which are opaque and the remainder transparent.

32. A glass article according to claim 31, in which the selected linear portions extend from one face of the sheet to the other face.

33. The method of producing a clear, transparent photosensitive glass capable of being thermally opacified only in such areas as have been previously exposed to short-wave radiations, which comprises melting in a batch for a clear, transparent glass comprising essentially 55% to 75% SiO₂, the indicated proportion of at least one alkali metal oxide selected from the group consisting of up to 2% Li₂O, 5% to 18% Na₂O, and up to 13% K₂O, the selected alkali metal oxide including Na₂O, the total alkali metal oxide content being 12% to 18%, 2% to 12% Al₂O₃, 0.0001% to 0.3% of silver computed as AgCl, 0.005% to 0.05% CeO₂, 1.8% to 3.0% of analytically determined fluorine, and the indicated proportion of a halogen selected from the group consisting of 0.01% to 0.2% of analytically determined chlorine, 0.02% to 0.4% of analytically determined bromine and 0.03% to 0.6 of analytically determined iodine, the essential constituents totaling at least 85%, said batch containing as a reducing agent up to 0.2% of corn starch on the basis of the glass.

34. The method of making a glass article having an opaque design formed within its mass, which includes the steps of exposing to short-wave radiations at least a portion of an article formed from a clear, transparent glass capable of being thermally opacified only in such areas as have been previously exposed to short-wave radiations and comprising essentially 55% to 75% SiO₂, the indicated proportion of at least one alkali metal oxide selected from the group consisting of up to 2% Li₂O, 5% to 18% Na₂O, and up to 13% K₂O, the selected alkali metal oxide including Na₂O, the total alkali metal oxide content being 12% to 18%, 2% to 12% Al₂O₃, 0.0001% to 0.3% of silver computed as AgCl, 0.005% to 0.05% CeO₂, 1.8% to 3.0% of analytically determined fluorine, and the indicated proportion of a halogen selected from the group consisting of 0.01% to 0.2% of analytically determined chlorine, 0.02% to 0.4% of analytically determined bromine and 0.03% to 0.6% of analytically determined iodine, the essential constituents totaling at least 85%, heating the exposed article for a time and at a temperature varying from about one minute at about 50° C. above the softening point of the glass to about one hour at about 150° C. below the softening point of the glass, cooling the article below about 500° C., reheating the article to a temperature not lower than about 100° C. below the softening point of the glass until its exposed portion develops the desired degree of opacity, and then cooling the article to room temperature.

35. The method as claimed in claim 34, in which the glass includes up to 5% B₂O₃.

36. The method as claimed in claim 34, in which the glass includes the indicated proportion of at least one divalent metal oxide selected from the group consisting of up to 3% BeO, up to 3% MgO, up to 3% CaO, up to 3% of a mixture of a plurality of such three oxides, up to 12% ZnO, up to 12% SrO, up to 5% CdO, and up to 12% BaO, the total divalent metal oxide content being not over 12%.

37. The method of producing a glass article containing a clear design against an opaque background, which comprises melting a batch for a clear, transparent glass comprising essentially 55% to 75% SiO₂, the indicated proportion of at least one alkali metal oxide selected from the group consisting of up to 2% Li₂O, 5% to 18%

Na$_2$O, and up to 13% K$_2$O, the selected alkali metal oxide including Na$_2$O, the total alkali metal oxide content being 12% to 18%, 2% to 12% Al$_2$O$_3$, 0.0001% to 0.3% of silver computed as AgCl, 0.005% to 0.05% CeO$_2$, 1.8% to 3.0% of analytically determined fluorine, and the indicated proportion of a halogen selected from the group consisting of 0.01% to 0.2% of analytically determined chlorine, 0.02% to 0.4% of analytically determined bromine and 0.03% to 0.6% of analytically determined iodine, the essential constituents totaling at least 85%, said batch containing as a reducing agent 0.2% to 0.6% of corn starch on the basis of the glass, forming the glass into an article, exposing a portion of the article to short-wave radiations and heating the article to a temperature not less than 100° C. below the softening point of the glass.

38. The method as claimed in claim 34, in which a portion of the glass initially exposed to short-wave radiations is re-exposed to such radiations following the initial heating step but prior to the final heating step, such re-exposed portion thereby remaining clear and transparent following the final heating.

39. The method of producing a clear, transparent photosensitive glass, which comprises melting a batch for a clear, transparent glass comprising essentially 55% to 75% SiO$_2$, the indicated proportion of at least one alkali metal oxide selected from the group consisting of up to 2% Li$_2$O, 5% to 18% Na$_2$O, and up to 13% K$_2$O, the selected alkali metal oxide including Na$_2$O, the total alkali metal oxide content being 12% to 18%, 2% to 12% Al$_2$O$_3$, 0.0001% to 0.3% of silver computed to AgCl, 0.005% to 0.5% CeO$_2$, 1.8% to 3.0% of analytically determined fluorine, and the indicated proportion of a halogen selected from the group consisting of 0.01% to 0.2% of analytically determined chlorine, 0.02% to 0.4% of analytically determined bromine and 0.03% to 0.6% of analytically determined iodine, the essential constituents totaling at least 85%, said batch containing a minor amount of an organic-type reducing agent.

STANLEY DONALD STOOKEY.

References Cited in the file of this patent

UNITED STATES PATENTS

| Number | Name | Date |
|---|---|---|
| 2,233,622 | Lytle | Mar. 4, 1941 |
| 2,281,076 | Nash | Apr. 28, 1942 |
| 2,314,804 | Willson | Mar. 23, 1943 |
| 2,326,012 | Dalton | Aug. 3, 1943 |
| 2,515,943 | Stookey | July 18, 1950 |

FOREIGN PATENTS

| Number | Country | Date |
|---|---|---|
| 110,925 | Australia | July 11, 1940 |